(12) United States Patent
Chen et al.

(10) Patent No.: US 7,277,693 B2
(45) Date of Patent: Oct. 2, 2007

(54) MOBILE DEVICE SERVER

(75) Inventors: Ming-Feng Chen, Hsinchu (TW);
Yih-Farn Robin Chen, Bridgewater, NJ (US); Chung-Hwa Herman Rao, Taichung (TW)

(73) Assignee: AT&T Corp, New York, NY (US)

( * ) Notice: Subject to any disclaimer, the term of this patent is extended or adjusted under 35 U.S.C. 154(b) by 44 days.

(21) Appl. No.: 10/998,214

(22) Filed: Nov. 26, 2004

(65) Prior Publication Data
US 2005/0240672 A1    Oct. 27, 2005

(51) Int. Cl.
*H04M 3/42*    (2006.01)
*H04Q 7/20*    (2006.01)

(52) U.S. Cl. .............. 455/414; 455/502; 455/426.1; 455/442; 455/435.3; 709/205; 709/209; 709/217

(58) Field of Classification Search .............. 455/414, 455/502, 426.1, 442, 435.3, 455; 709/217, 709/205, 209
See application file for complete search history.

(56) References Cited

U.S. PATENT DOCUMENTS

| | | | | |
|---|---|---|---|---|
| 5,903,832 A | * | 5/1999 | Seppanen et al. | 455/435.3 |
| 5,911,776 A | * | 6/1999 | Guck | 709/217 |
| 5,978,676 A | * | 11/1999 | Guridi et al. | 455/426.1 |
| 6,206,018 B1 | * | 3/2001 | Daniels, Jr. | 135/69 |
| 6,223,042 B1 | * | 4/2001 | Raffel | 455/455 |
| 6,445,921 B1 | * | 9/2002 | Bell | 455/426.1 |
| 6,542,754 B1 | * | 4/2003 | Sayers et al. | 455/502 |
| 2002/0037709 A1 | * | 3/2002 | Bhatia et al. | 455/414 |

* cited by examiner

*Primary Examiner*—William Trost
*Assistant Examiner*—Julio Perez

(57) ABSTRACT

A mobile device server includes a flexible architecture having a plurality of components for allowing various mobile devices and protocols to communicate with each other and to receive data from various information spaces. Interface devlets send and receive messages in respective protocols. Access infolets utilize respective access methods to provide an abstract view of various information spaces. Logic applets implement service and/or application logic by processing information from one or more infolets. A further component referred to as a let engine communicates with the devlets, infolets, and applets, and maintains user and device profile information to provide a flexible framework for the mobile device server that can readily support new devices and protocols.

5 Claims, 13 Drawing Sheets

MOBILE DEVICE SERVER

CROSS REFERENCE TO RELATED APPLICATIONS

This application claims priority from U.S. patent application Ser. No. 10/037,570, filed 11/09/2001 now abandoned, which claims priority from U.S. patent application Ser. No. 09/853,151, filed 05/10/2001 now abandoned, which claims priority from U.S. Provisional Patent Application Ser. No. 60/248,816, filed 11/15/2000.

STATEMENT REGARDING FEDERALLY SPONSORED RESEARCH

Not Applicable.

FIELD OF THE INVENTION

The present invention relates generally to communication systems and, more particularly, to portable wireless communication systems.

BACKGROUND OF THE INVENTION

As is known in the art, wireless Internet access is different from simply accessing the Internet wirelessly. Mobile wireless users have different needs, motivations and capabilities from typical wireline users. For example, a mobile user is usually in a multi-tasking mode, e.g., accessing the Internet while attending a meeting or shopping in the mall. Typical Internet accesses are bursty in nature (checking stock quotes, weather, or finding a nearby restaurant) and task-oriented. Thus, browser-centric applications and elaborate user interfaces are of limited utility since a mobile user usually carries small devices such as a cell phone or a Personal Digital Assistant (PDA) having relatively small displays. These personalized devices, which are typically identified by a wireless network address such as a cellular phone number, provide mobile users with continuous access to the Internet.

Advances in wireless networking and messaging technologies have given mobile users many choices to access Internet contents and services. Existing devices and protocols include PDAs, such as Palm Pilots with Web Clipping, cell phones with wireless application protocol (WAP) or short message service (SMS), email devices, such as Blackberry and AT&T PocketNet, supporting Post Office Protocol 3 (POP3) and/or (Internet Message Access Protocol) IMAP, and America On Line (AOL) Instant Messaging (AIM).

While such devices and protocols can provide limited Internet access, differing devices and protocols do not communicate with each other easily. Thus, business and individual mobile users must make challenging decisions to obtain mobile access in a constantly changing environment. For example, employees of a particular company may need to use a single type of device to enable wireless communication between the employees. However, one device type may not be optimal or desirable for the duties each employee must perform.

It would, therefore, be desirable to provide wireless communication for a variety of mobile device types and protocols. It would further be desirable to provide wireless communication with a variety of information spaces. It would also be desirable to readily support wireless communication for new devices and protocols.

SUMMARY OF THE INVENTION

The present invention provides a mobile device server for providing communication with a variety of protocols and devices. The mobile device server provides a message gateway for allowing mobile devices using a range of protocols and access networks to relay messages to each other and to obtain information from a range of information spaces. With this arrangement, a mobile user can readily communicate with other mobile users having the same or different devices. A mobile user can also obtain data from a wide range of resources, such as the Internet and databases. While the invention is primarily shown and described in conjunction with portable mobile devices, it is understood that the invention is generally applicable to systems in which it would be desirable for differing device types and protocols to communicate with each other.

In one aspect of the invention, a mobile device server includes a plurality of components that cooperate to enable a mobile device to communicate with other mobile device types and with a variety of information space types. In one embodiment, a mobile device server includes an engine component that communicates with the mobile server components and maintains user profile information. The server includes a plurality of interface components each of which corresponds to a particular device type or protocol, for example. A plurality of access components provide abstract views of respective information spaces, such as websites, databases, and corporate information. Each of a plurality of logic components processes information retrieved by one or more of the access components for transmission back to the requesting mobile device via the corresponding interface component.

The engine component communicates with the interface, access and logic components and maintains user/device profiles. In one embodiment, the engine component communicates with the interface components in a predetermined format, translates aliased user commands, invokes appropriate logic and access components, and transcodes retrieved data into a format based upon characteristics, e.g., display size, of the requesting device.

In an exemplary operation, a mobile device issues a request for the latest stock price of a particular company. The mobile device has a particular messaging client, such as America On Line's Instant Messenger (AIM). The mobile device communicates with the mobile device server via an AIM interface component, which receives the request for stock data and formats the request into a predetermined format. The engine component receives the formatted request, validates the mobile user identification, and transforms command aliases, e.g., q for "quote".

The engine component then sends the data request to an appropriate logic component, which can for example, determine an optimum stock quote service based upon certain criteria. The logic component then requests the engine component to invoke the appropriate access component corresponding to the selected quote service, e.g., Yahoo. The access component then utilizes the proper mechanism, e.g., Hyper Text Transfer Protocol (HTTP), to retrieve the requested content.

The retrieved raw content is returned to the engine component for examination and formatting. The engine component accesses the profile of the recipient device to which the requested information is to be sent, which may or may not be the requesting mobile device. Based upon the profile of the recipient device, the engine component invokes an appropriate access component for transcoding the retrieved raw content into the appropriate format, e.g., text only. The engine component then delivers the transcoded data to the interface component corresponding to the recipient device for transmission.

BRIEF DESCRIPTION OF THE DRAWINGS

The invention will be more fully understood from the following detailed description taken in conjunction with the accompanying drawings, in which.

DETAILED DESCRIPTION OF THE INVENTION

In general, the present invention provides a mobile device server that operates as a message gateway for allowing mobile devices using various protocols on different access networks to communicate with each other. The mobile device server also allows mobile clients to access resources and information on the Internet and various other networks. The mobile device server includes a flexible architecture having a plurality of components that cooperate to service mobile device communication requests. Mobile device server components include a let engine component communicating with interface devlets, logic applets, and access infolets. This arrangement allows the mobile device server to readily support new devices and protocols by adding corresponding devlets, infolets, and applets without altering the existing service logic.

As described more fully below, interface devlets receive and send messages through a particular protocol used by various mobile devices. Access infolets utilize particular access methods to provide an abstract view of respective information spaces. And access applets implement service or application logic by processing information from one or more infolets. The let engine provides the basic framework for maintaining applets, devlets and infolets, supporting user and device profiles for personalization and transcoding, and invoking proper applets and infolets to answer data requests from devlets.

Figure 1:
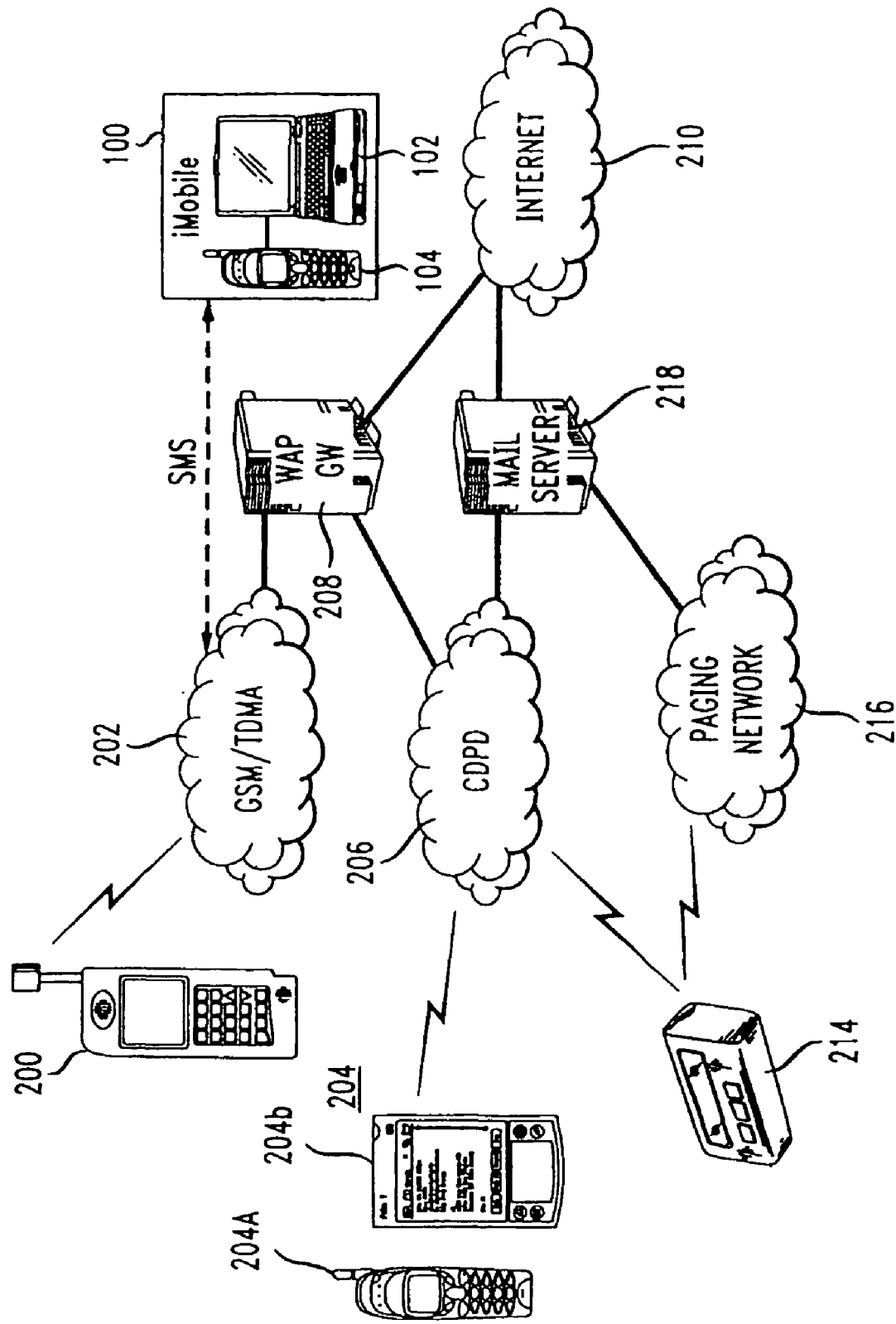
FIG. 1 is a schematic depiction of a mobile device server for communicating with a variety of devices and networks in accordance with the present invention.

FIG. 1 shows an exemplary embodiment of a mobile device server 100 for enabling mobile users to communicate with a variety of devices and protocols in accordance with the present invention. The mobile device server 100 can run on a computer 102 having connections to a plurality of networks and devices. It is understood that the mobile device server can operate on a variety of known computers and operating systems, such as Unix and Windows. In one embodiment, the mobile device server 100 is implemented using the Java programming language running in a Windows environment.

The mobile device server 100 further includes a mobile phone device 104 for receiving and transmitting data via wireless communication. The mobile phone 104 can support Short Message Service (SMS) communication, which is well known to those skilled in the art. While shown as a wireless phone coupled to the computer, it will be readily apparent to one of ordinary skill in the art that mobile device server functionality can be readily integrated into a single device. In addition, the mobile device server can include a number of wireless devices, which can be the same or different type, coupled to the computer 102.

The mobile device server 100 enables communication between various devices and networks. In the illustrated embodiment, a cell phone 200 with two-way short messaging service (SMS), e.g., a Global System for Mobile Communication/Time Division Multiple Access (GSM/TDMA) phone connected to a GSM/TDMA network 202, can communicate with the mobile device server 100 through an SMS driver hosted on the mobile device server. Cellular Digital Packet Data (CDPD) devices 204, such as AT&T PocketNet phone 204a and Palm V 204b, coupled to a CDPD network 206 can use a Wireless Access Protocol (WAP) gateway 208 to access the mobile device server 100 through the Internet 210. Email devices 214, such as a Blackberry mobile device, can use the Standard Email Protocol (SMTP) on the CDPD network 206 or a two-way paging network 216 coupled to a mail server 218 to communicate with the mobile device server 100.

In addition, PC device users and some PDAs can use AOL Instant Messenger (AIM) or web browsers to communicate with the mobile device server 100, which can support a Transmission Control Protocol (TCP) interface. Mobile devices can include an embedded module for communicating with the mobile device server 100 directly via the TCP interface. The mobile device server 100 can receive messages and commands from these devices, access Internet services and information on behalf of a mobile user, and relay messages or Internet content back to the sending devices or other devices, as described more fully below.

The mobile device server 100 includes an architecture having a plurality of interface, logic, and access components that enable the mobile device server to communicate with a range of devices, protocols and information spaces. This arrangement hides the complexity of multiple devices and content sources from mobile users. The mobile device server 100 can include a proxy server that provides an environment for hosting agents and personalized services, which can be implemented as reusable building blocks in the Java programming language, for example. An exemplary proxy server known as iProxy, is shown and described in U.S. patent application Ser. No. 08/974,600, filed on Dec. 19, 1997, and Ser. No. 09/474,914, filed on Dec. 30, 1999, which are incorporated herein by reference. In general, an iProxy agent, which can include a web-server, can be invoked like a regular common gateway interface (CGI) program. The iProxy system also allows scripts embedded inside web pages to invoke agents to perform specialized processing. The iProxy system maintains user profiles and adds intelligence to the traditional HTTP proxy server to provide personalized, and value-added services such as filtering, tracking, and archiving.

Figure 2:
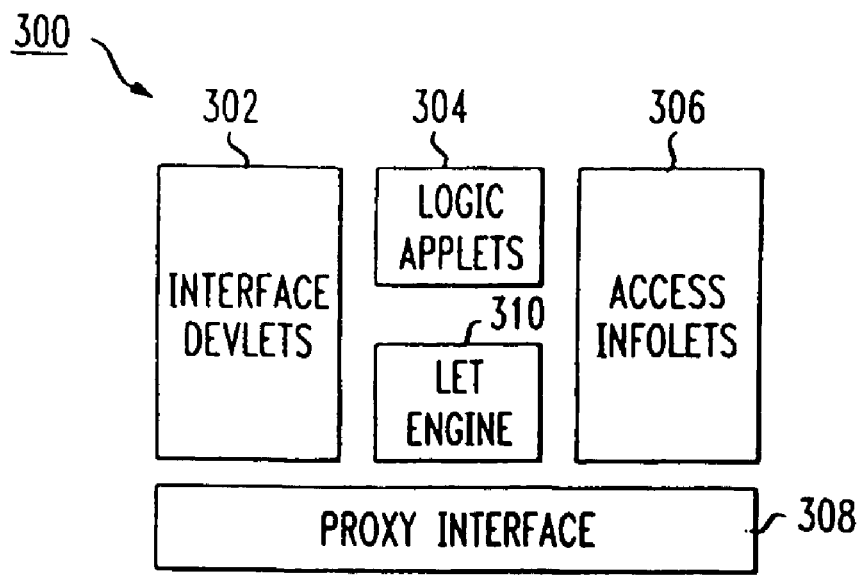
FIG. 2 is a schematic block diagram of an exemplary architecture for the mobile device server of FIG. 1.

FIG. 2 shows an exemplary architecture for a mobile device server 300 having a plurality of components that combine to provide a flexible architecture that can readily support new devices, interfaces and information spaces. In one particular embodiment, the mobile device server 300 includes interface devlets 302, logic applets 304 and access infolets 306. The devlet, infolet, and applets 302, 304, 306, as well as a proxy interface 308, communicate with each other through a let engine 310. These components can be implemented as iProxy agents.

Figure 3:
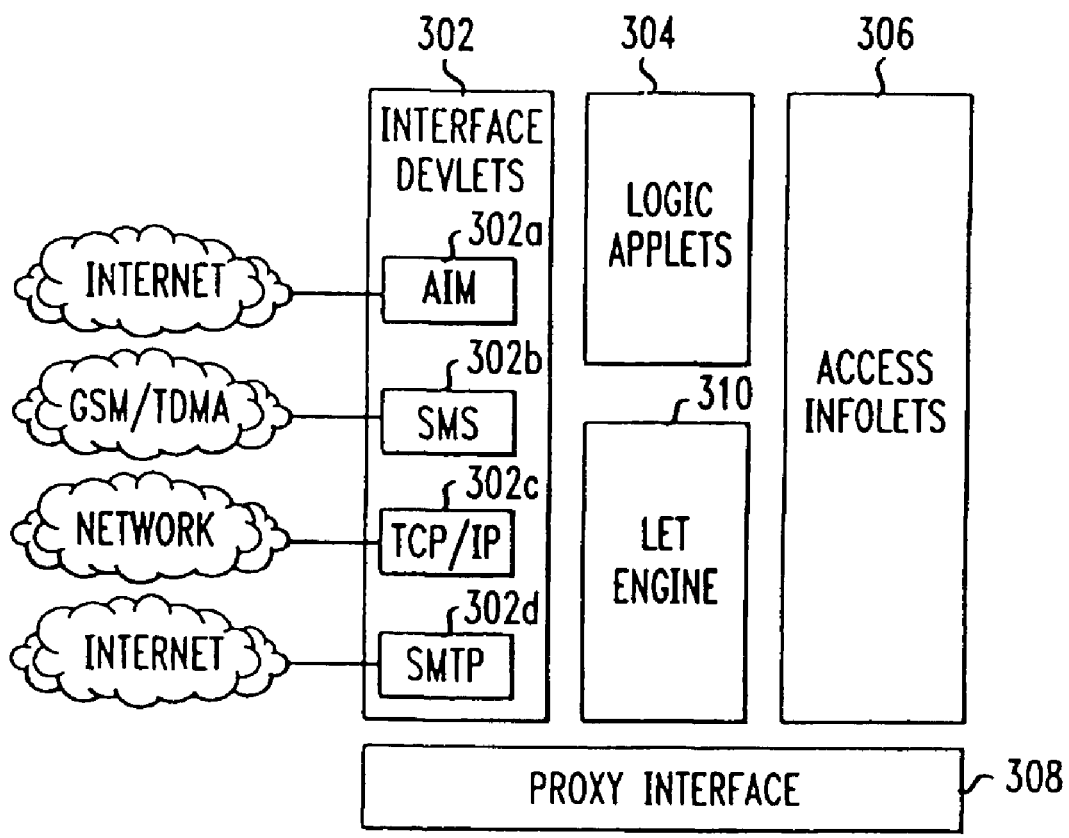
FIG. 3 is a schematic block diagram showing the mobile device server having a plurality of interface devlets in accordance with the present invention.

As shown in FIG. 3, each interface devlet 302 provides a protocol interface to a given device on a particular access network. As described above, exemplary access network types include the Internet, CDPD, and GSM/TDMA, each of which is supported by one or more corresponding interface devlets. In the illustrative embodiment, an AIM devlet 302a, a GSM/TDMA devlet 302b, a TCP/IP devlet 302c, and a SMTP/IMAP devlet 302d are shown for communicating with the corresponding networks. It is understood that further interface devlets can be provided for a variety of additional protocols well known to one skilled in the art. For example, email devlets can include SMTP, IMAP and POP3 devlets for sending and retrieving email.

The interface devlets 302 interact with the let engine 310 via a predetermined interface format. In one particular embodiment, the devlets 302 provide requests to the let engine 310 in character-stream command lines and the let engine returns results in Multipurpose Internet Mail Extensions (MIME) format. After the mobile device server 300 is initialized, each interface devlet 302 monitors a respective channel for incoming requests sent by a remote mobile device. For example, the AIM devlet 302a on the mobile device server starts an AIM client for listening to service requests from other AIM clients sent as instant messages.

It is understood that the required device driver can form a part of a corresponding interface devlet 302 or can communicate with the devlet through a TCP protocol, for example. This approach allows a device driver to run on a remote machine, i.e., a device other than on the mobile device server.

Figure 4:
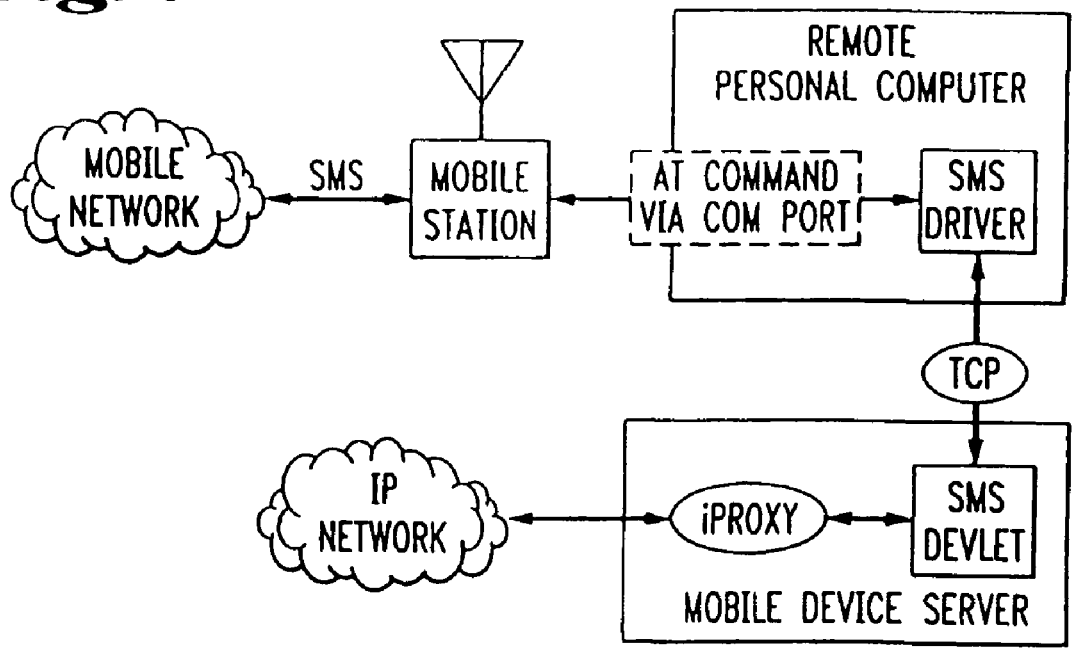
FIG. 4 is a schematic depiction of an exemplary communication path configuration for a mobile device server in accordance with the present invention.

FIG. 4 shows an exemplary communication path between an SMS mobile station MS and a mobile device server MDS in accordance with the present invention. An SMS devlet running on the mobile device server MDS communicates with a GSM cell phone MS attached to a remote personal computer RPC through an SMS driver. Mobile users can send messages to the cell phone MS (through the GSM network), which then forwards each message to the mobile device server MDS for processing. The mobile device server MDS then returns the result to the mobile user through the same channel. Such an arrangement is further shown and described in U.S. Provisional Application Ser. No. 60/206, 167 entitled "Mobile Phone Internet Access Utilizing Short Message Service Method and Apparatus," filed May 22, 2000, which is incorporated by reference herein.

Similarly, to allow access to the mobile device server through email, a mobile device server email devlet can monitor messages arriving at a particular email account for new service requests. For TCP users, a TCP session is created upon receiving a request to connect with a particular port of the mobile device server machine using the telnet protocol. The telnet user can enter mobile device server commands as if using a typical Unix or Windows terminal, for example. The mobile device server can also support the WAP and HTTP protocols through the proxy interface 308 (FIG. 2).

Referring again to FIG. 2, while each protocol and device can have unique interfaces, each corresponding interface devlet 302 interacts with the let engine 310 in a predetermined format. More particularly, a devlet 302 can send a data request in the form of a character stream, interpreted as an mobile device server command and associated parameters, to the let engine 310. The devlet 302 can receive results from the let engine 310 in a Multipurpose Internet Mail Extensions (MIME) format appropriate for the device, which is determined by the corresponding device profile stored at the let engine. Device profiles contain information for user devices, such as how much information can be displayed.

A simplified version of the mobile device server command syntax is listed below:

<command>:=[<forward_command><destinations>]<applet_command>[<applet_argument>]*
<destinations>:=<destination>[","<destination>]*
<destination>:=<protocol>":"<account$_{id}$>

In this particular embodiment, the naming of each device or destination follows the conventional URL naming scheme: protocol name followed by an account name or address. For example, typical destination addresses include "sms:+ 19735556242"(GSM cell phone), "aim:sunshineX"(AIM buddy name), "mail:iproxy@research.att.com (email id)", etc.

As described more fully below, after receiving the command, the let engine 310 invokes one or more logic applets 304 that implement the required logic for the data request.

The let engine 310 then invokes the access infolet 306 appropriate for the information space to be accessed.

Figure 5:
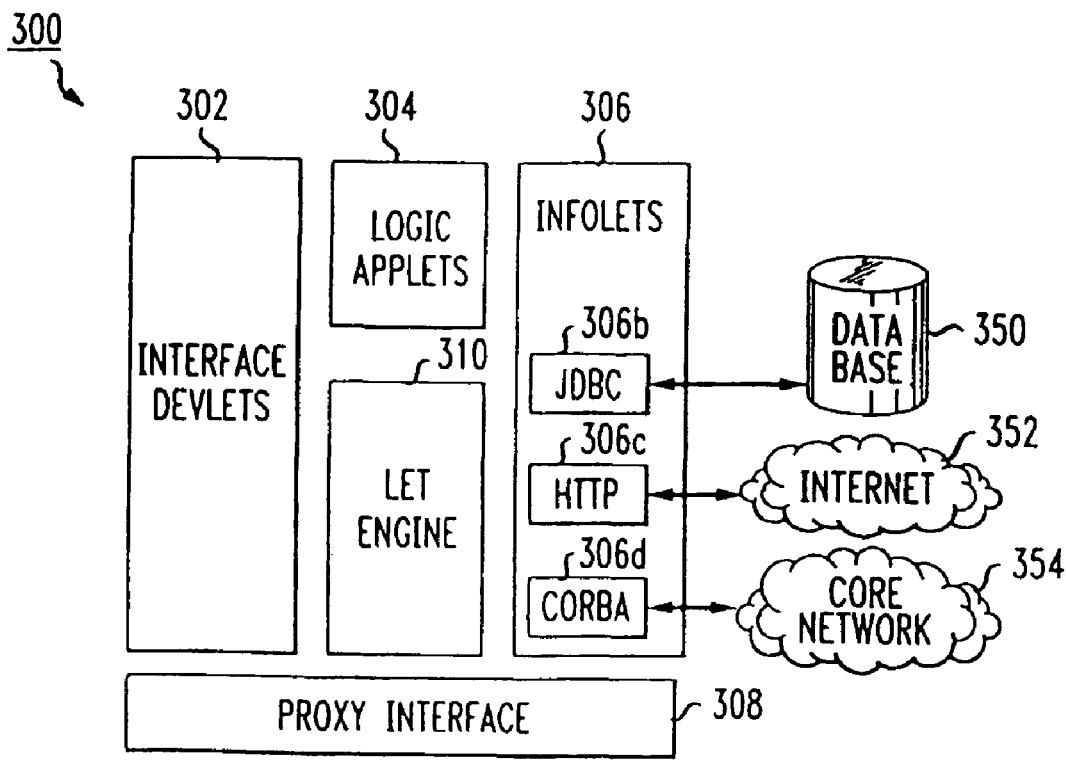
FIG. 5 is a schematic block diagram showing the mobile device server having a plurality of access infolets in accordance with the present invention.

Referring briefly to FIG. 5, the access infolets 306 extend beyond the HTTP protocol and URL name space to provide abstract views of various information spaces, such as databases 350, Internet information sources 352, core networks 354, and X10 home devices. Corresponding access infolets, such as Java Data Base Connectivity (JDBC) 306a, http 320b, CORBA 306c infolets access the respective information spaces as shown. A given interface infolet 306 retrieves information from a particular information space, such as stock quote sites, weather sites, and airline flight databases. It is understood that the same information may be accessed using a variety of access protocols. For example, such information is commonly available on many websites, and may also be retrieved from XML files or databases. An interface infolet retrieves the original content and returns it to an appropriate applet 304 for further processing, as described more fully below.

As an example of a mobile station request to access the stock price of AT&T (stock symbol T), the mobile device user can issue a "quote T" command. If the request is sent by a mobile user using SMS on the GSM network, then the result will be returned as plain text to the requesting GSM cell phone. If the mobile user wants to forward the result to an email address, e.g., herman@research.att.com, the user issues a "forward mail:herman@research.att.com quote T" command. Since that email account understands the MIME type text/HTML (according to the device profile), the result will be sent by the let engine as an HTML file, complete with graphics, to the herman@research.att.com email account.

The interface devlets 302 allow users on different networks to readily communicate with each other. For example, if a GSM phone user wants to send a message to other devices, such as an AT&T PocketNet mail account, e.g., chen@mobile.att.net, which is on the CDPD network, and an AT&T TDMA phone having phone number 555-500-6531 using SMS, then an echo applet can use a message relay service as follows: "forward mail: chen@mobile.att.net, attmsg:5555006531 echo call your boss."

Figure 6:
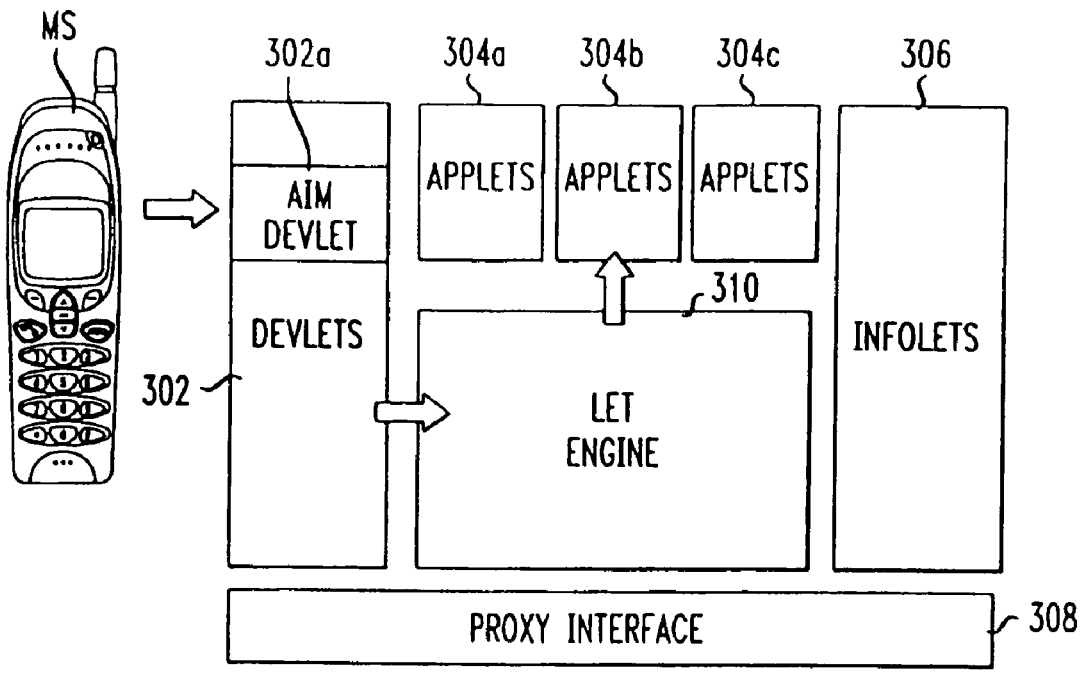
FIG. 6 is a schematic block diagram showing a first part of a data transfer by a mobile device server in accordance with the present invention.

FIGS. 6-9 show an exemplary transaction between a mobile device MS and a mobile device server 300 in accordance with the present invention. As shown in FIG. 6, the mobile device MS, such as a Palm Vx with a CDPD modem having an AIM client, issues a "q T" (quote AT&T-stock symbol T) command, which requests that the mobile device server 300 retrieve the current price of AT&T stock. The Palm Vx MS establishes a communication channel with the mobile device server 300 via an AIM devlet 302a, e.g., imobile4att. The AIM devlet 302a receives the instant message from the Palm Vx device and formats the message into a predetermined format, e.g., "q T" in text, prior to passing the message to the engine component or let engine 310. The engine component 310 transforms any aliases, e.g., q for quote, defined by the mobile device user and authenticates the user. The engine component 310 then invokes the appropriate logic applet 304b, which can implement predetermined logic for selecting a stock quote service, such as MSN, Yahoo, Etrade, etc.

Figure 7:
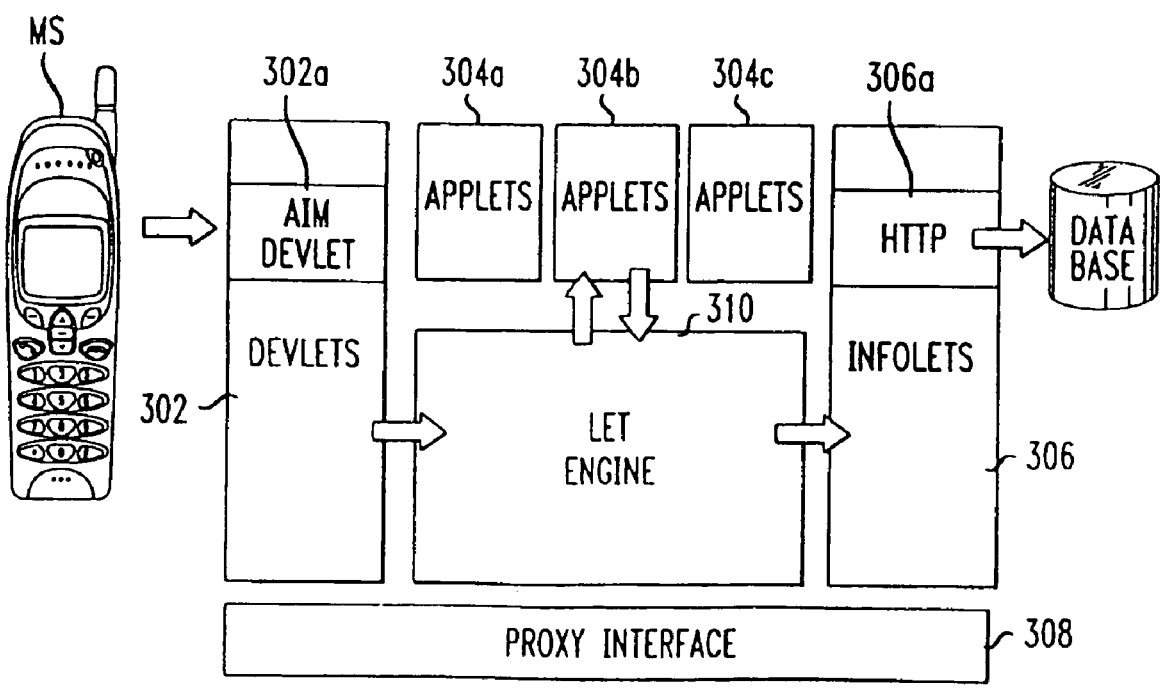
FIG. 7 is a schematic block diagram showing a second part of a data transfer by a mobile device server in accordance with the present invention.
Figure 8:
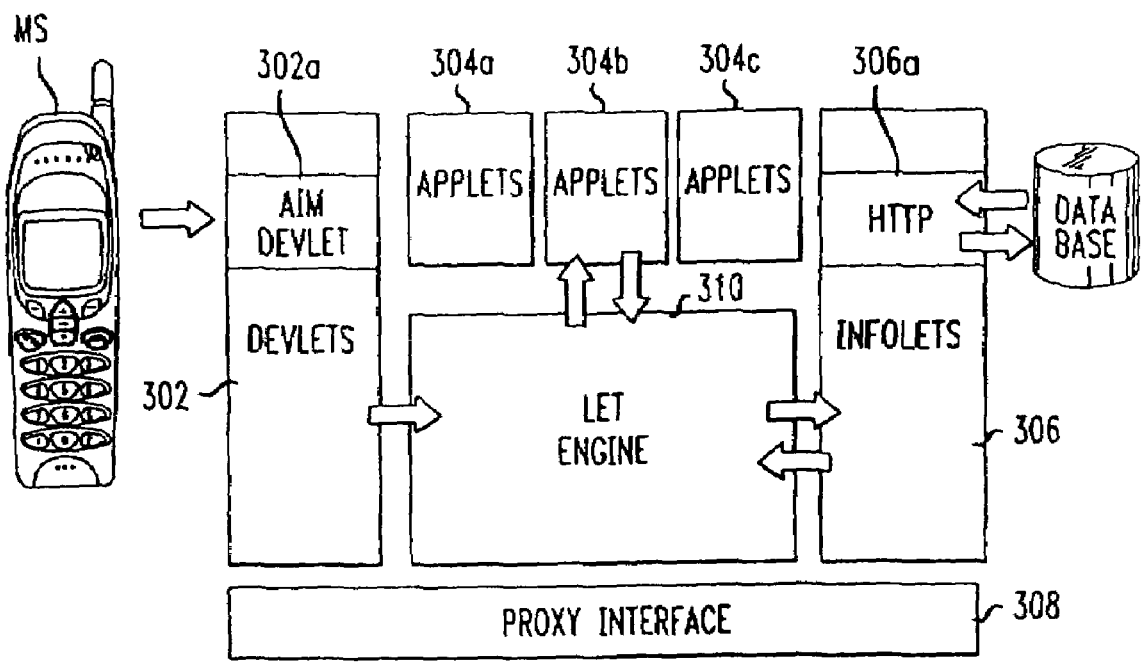
FIG. 8 is a schematic block diagram showing a third part of a data transfer by a mobile device server in accordance with the present invention.

As shown in FIG. 7, the logic applet 304b then requests the let engine 310 to invoke the appropriate, e.g., http, access infolet 306a. In FIG. 8, the access infolet 306a retrieves the request stock information using the mechanism, e.g., http, appropriate for the selected quote service. The infolet 306a then returns the raw data, which can be in HTML format, to the let engine 310.

Figure 9:
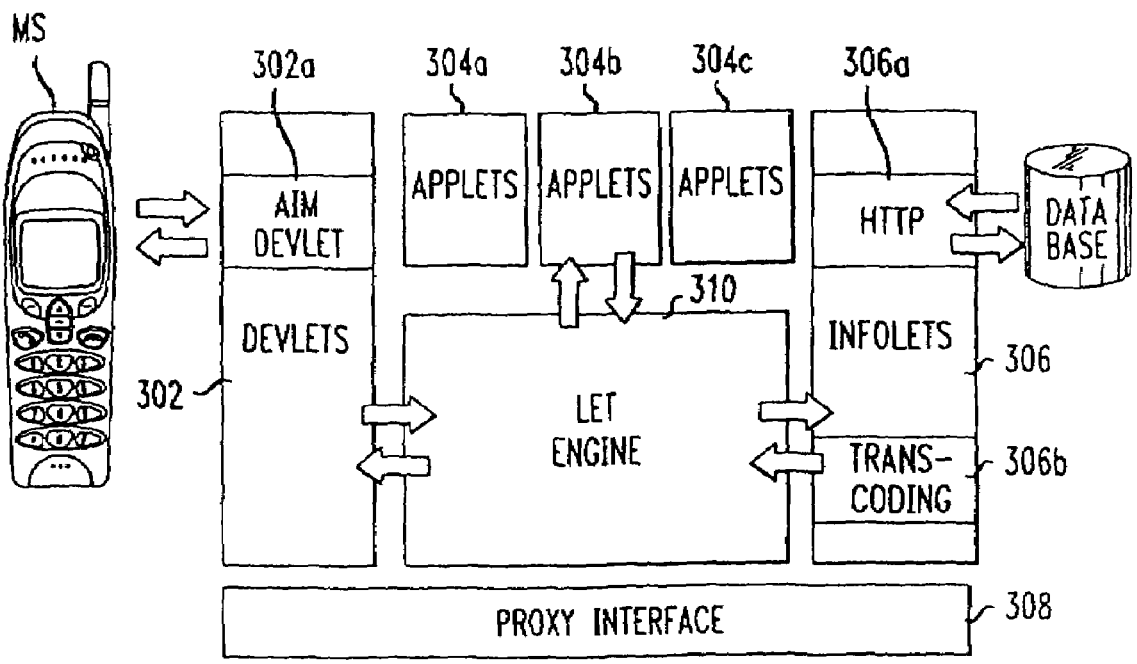
FIG. 9 is a schematic block diagram showing a fourth part of a data transfer by a mobile device server in accordance with the present invention.

As shown in FIG. 9, the let engine 310 examines the raw data, as well as profile data for the recipient device, which can be the same or different from the requesting mobile device MS. For example, the mobile device MS can request data to be forwarded to a specified device, such as an email account. Based upon the profile of the recipient device, the let engine 310 can send the raw data to a transcoding infolet 306b for processing. In the case where the recipient device accepts only text in messages less than 1000 bytes, the transcoding infolet 306b transcodes the raw data accordingly. After the infolet converts the data into text, the let engine 310 then delivers the text message to the AIM devlet 302a, if the Palm Vx device MS is the recipient device.

It is understood that the mobile device server of the present invention can communicate with a wide variety of mobile device types. In addition, the architecture of the mobile device server can readily support new functionality with applets, new devices with devlets, and new information spaces with infolets.

Figure 10A:
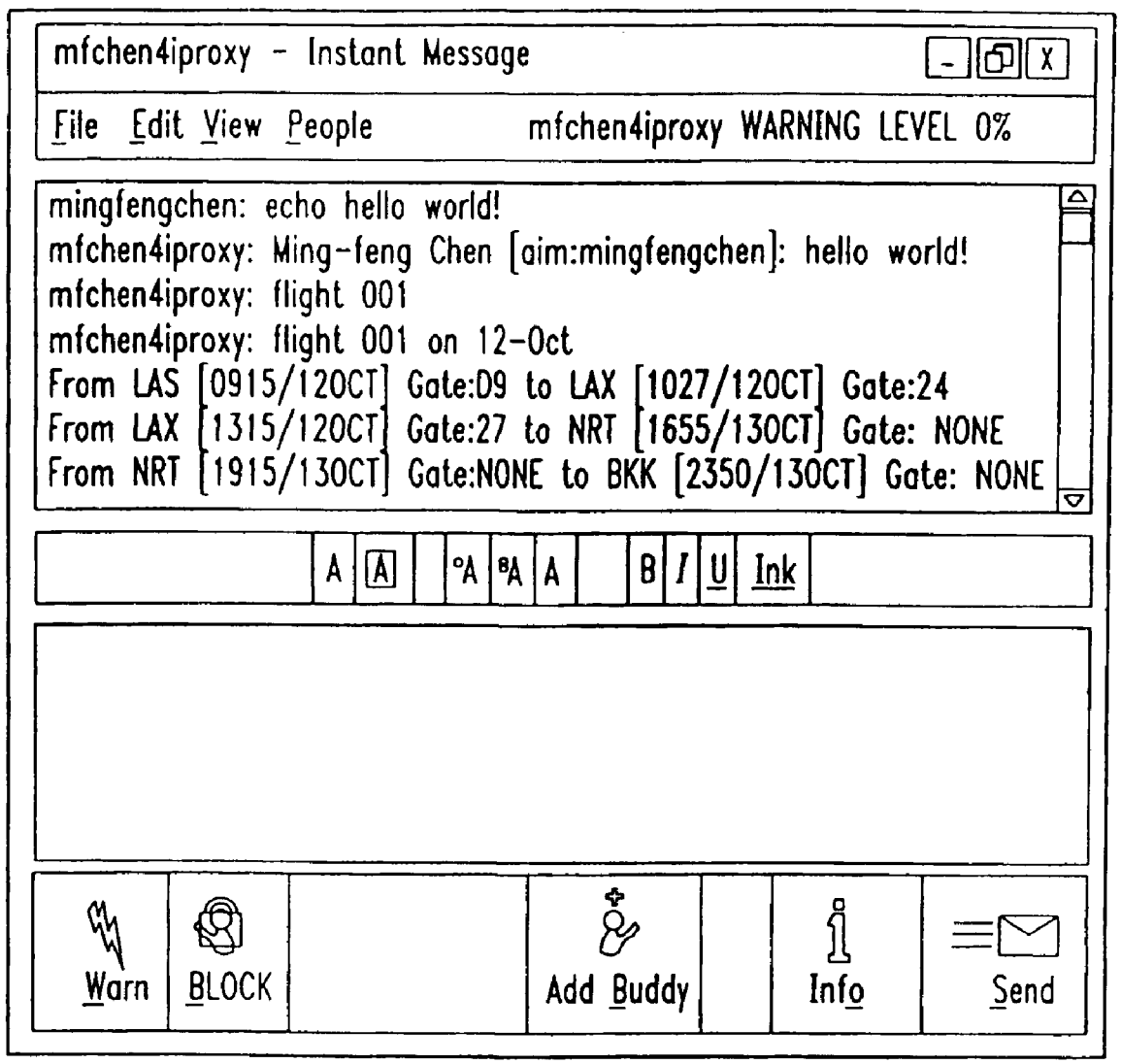
FIG. 10A is an exemplary screen display showing Internet access of flight info from an AIM device through the AIM devlet on the mobile device server in accordance with the present invention.

FIG. 10A shows an AIM client, mingfengchen, on an exemplary mobile device that talks to the mobile device server AIM agent, mfchen4iproxy. The AIM client issues the "flight 001" command to get flight information on a particular airline and receives output including time and gate information for each leg of the flight. Mapping from the flight command to the airline can be controlled by a corresponding logic applet according to the user profile. Also, the let engine invokes necessary transcoding services to map the elaborate content on the airline website to the receiving device according to AIM device's profile.

Figure 10B:
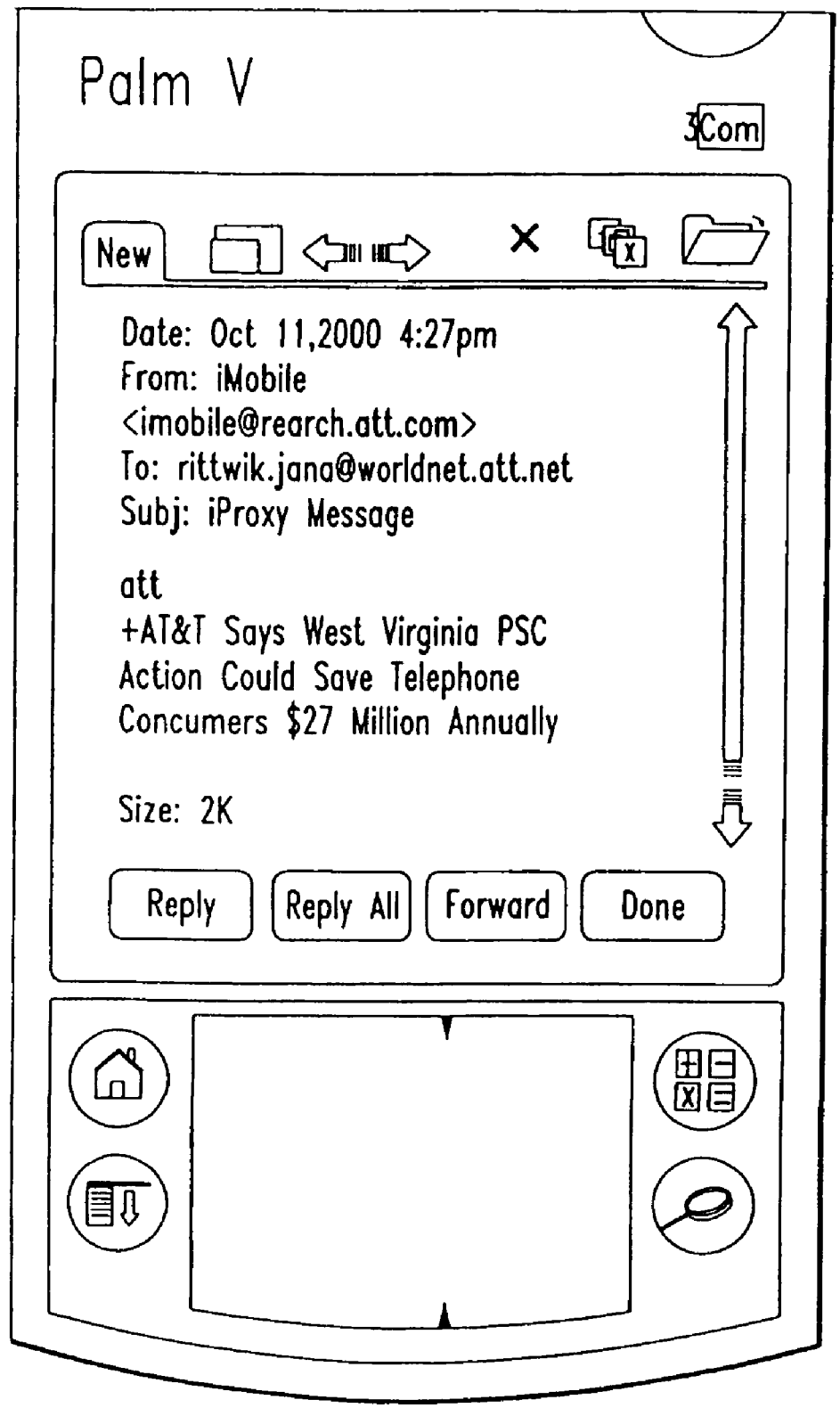
FIG. 10B is an exemplary screen display showing website news access from a Palm V device through the email devlet on the mobile server in accordance with the present invention.

FIG. 10B shows a Palm V device having an Omnisky modem that just sent an email to the mobile device server email devlet at imobile@research.att.com with the command "sitenews att." This command instructs the mobile device server to access the service provided by AT&T's Website News, which reports new hyperlinks on AT&T's website (http://www.att.com). The result is sent back as an email formatted for the Palm V device.

Figure 11A:
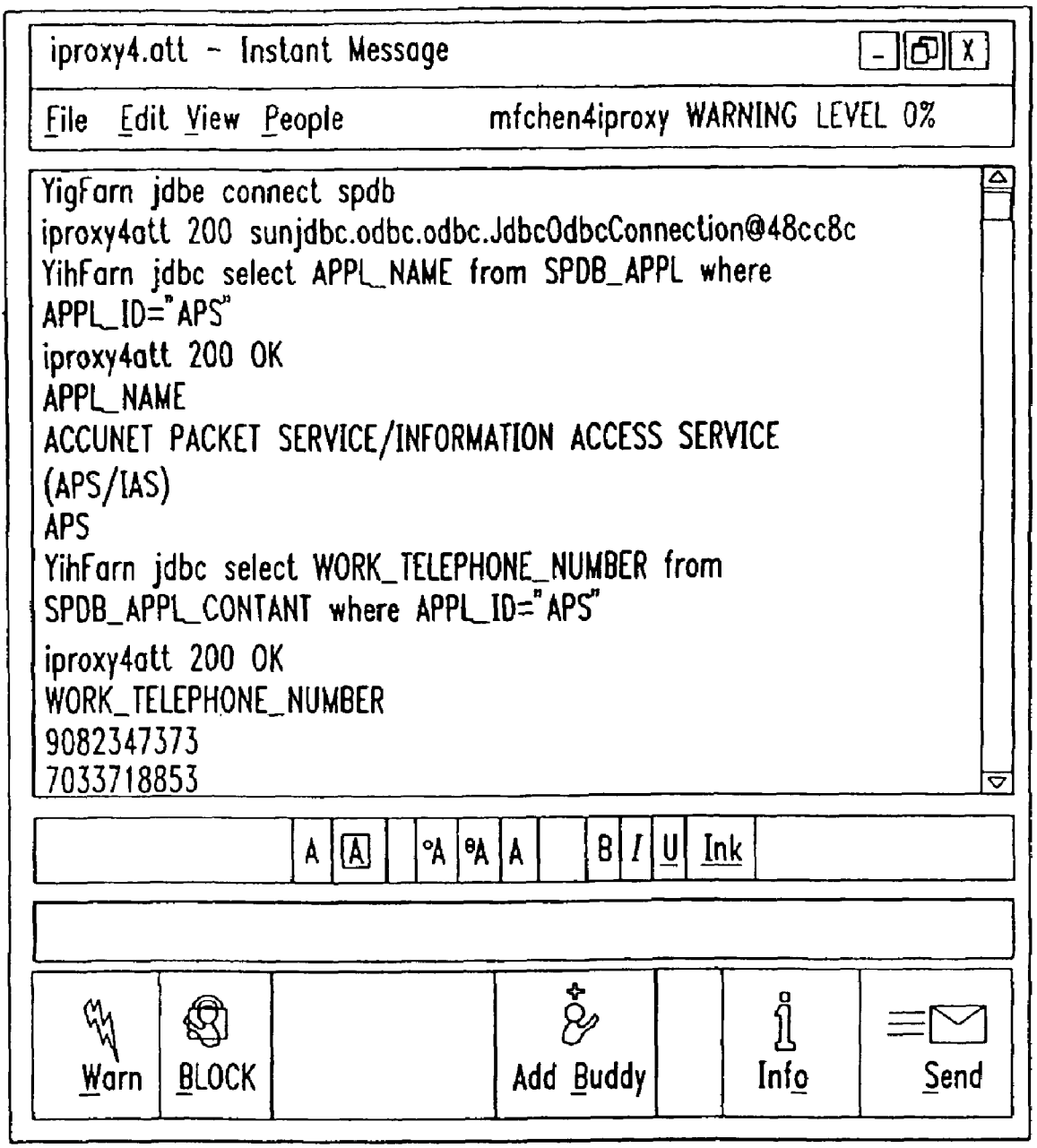
FIG. 11A is an exemplary screen display for a device accessing a corporate database through the JDBC infolet on the mobile device server in accordance with the present invention.
Figure 11B:
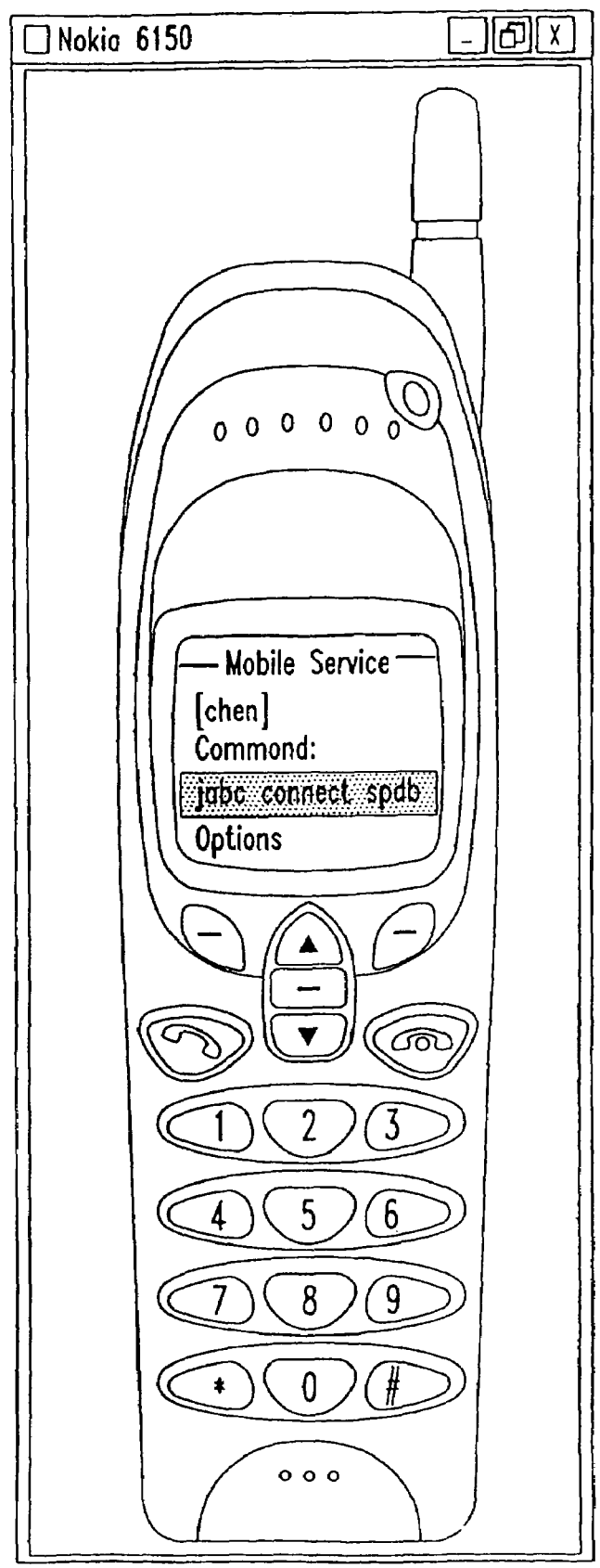
FIG. 11B is an exemplary screen display for a mobile phone accessing a corporate database through the JDBC infolet on the mobile device server in accordance with the present invention.

FIG. 11A shows a mobile user connecting to an enterprise database through an AIM client to find contact numbers for a particular software application using the mobile device server of the present invention. FIG. 11B shows how to access the same information from a cell phone that supports the WAP protocol. Corporate Information is typically accessed through JDBC and ODBC interfaces. The mobile device server includes a JDBC infolet that allows mobile users to access enterprise database information (marketing/sales data, system interface, etc.) through SQL-like queries.

Figure 12:
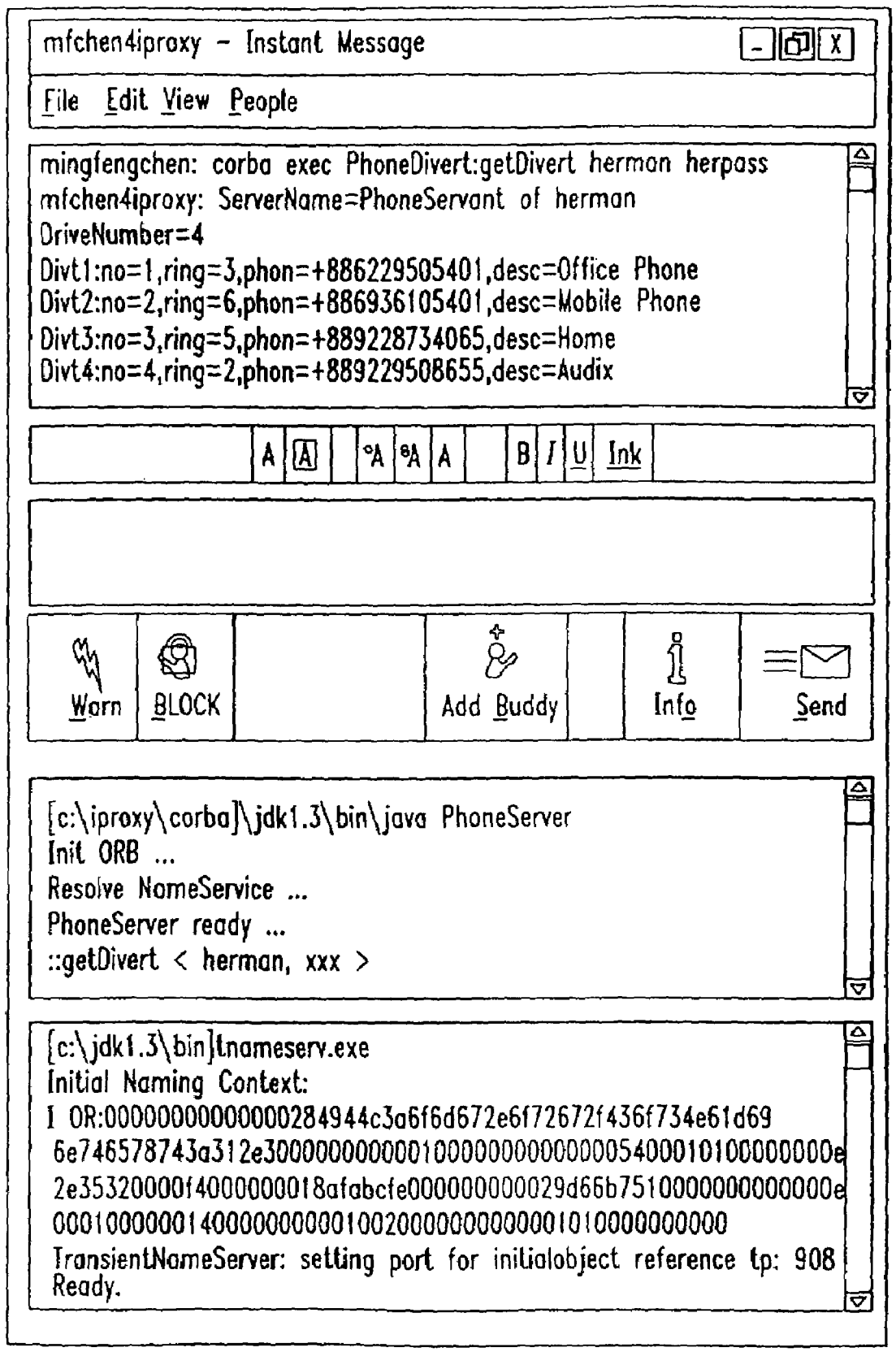
FIG. 12 shows an exemplary screen display for a device requesting service from a CORBA object through the AIM devlet on the mobile device server in accordance with the present invention.

Network/Infrastructure Resources are typically accessed through the CORBA (Common Object Request Broker Architecture) interface. As known to one of ordinary skill in the art, CORBA is an architecture and specification for managing distributed program objects in a network to allow programs at different locations to communicate through an "interface broker." The mobile device server hosts a CORBA infolet that allows mobile users to request services from CORBA objects. FIG. 12 shows how an AIM user gets phone diversion information for the user Herman.

Figure 13:
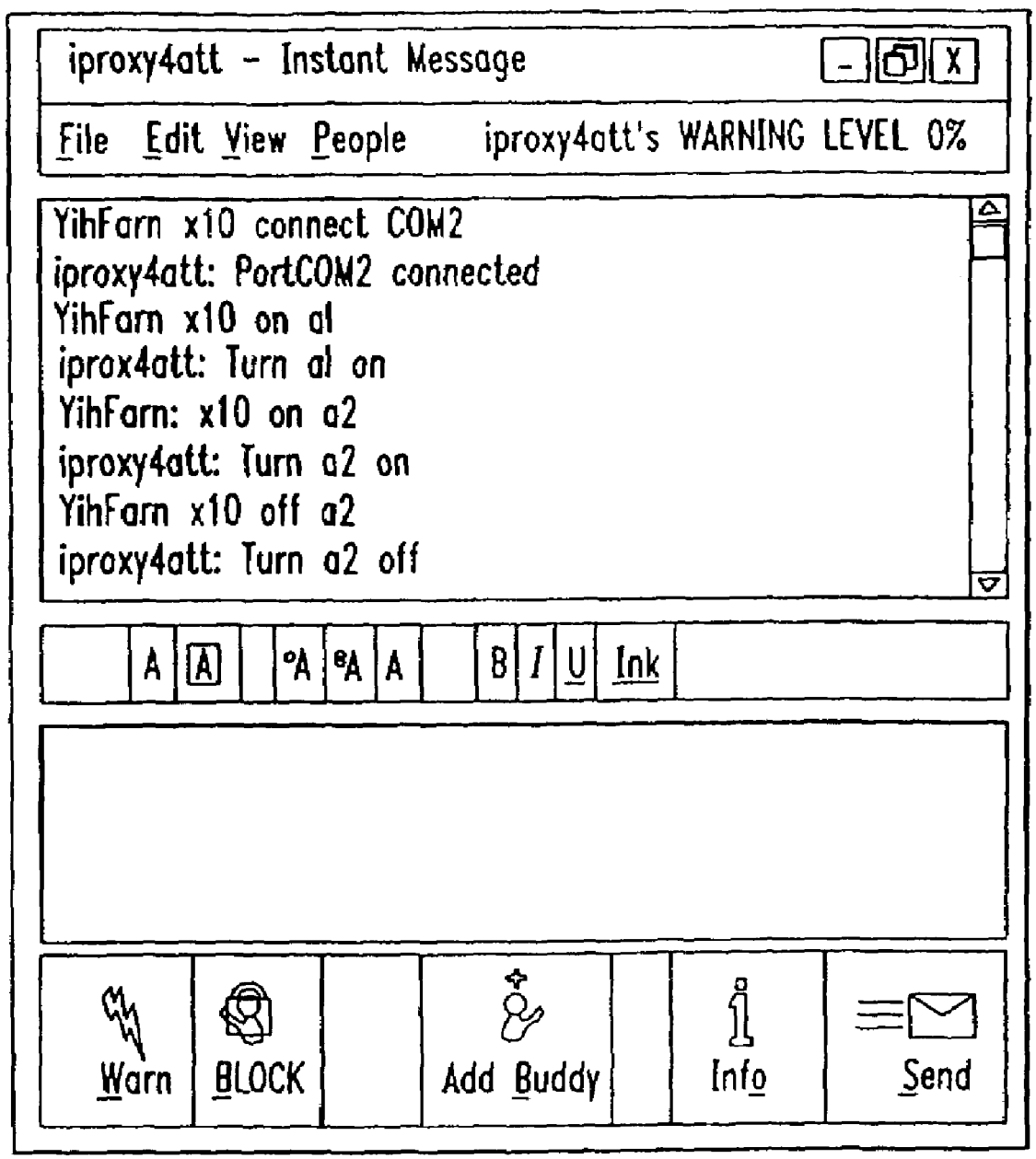
FIG. 13 is an exemplary screen display for a device controlling X10 home network devices through the AIM devlet on the mobile device server in accordance with the present invention.

FIG. 13 shows a mobile device user controlling X10 devices remotely via the mobile device server of the present invention. The X10 home network technology allows lamps and appliances connected on the same power line to be controlled by a computer. The mobile device server hosts an X10 infolet that controls home network devices connected to its server machine. First, the user instructs the mobile device server to locate the firecracker, the device that is capable of sending a radio signal to a transceiver device on the X10 network, through the serial port COM2 on the mobile device server host. After the connection is established, a command, e.g., "×10 on a1" is sent to turn on the fan (which is named device a1 on that particular X10 network) and "×10 on a2" to turn on the coffee pot. The X10 interface allows a mobile user to control the lighting and appliances at home with a GSM cell phone, an AIM client, or an email device anywhere in the world. The X10 infolet also demonstrates that an infolet can be used to both retrieve and change the state of an information space. An applet based on X10 infolets can use an algorithm to determine when and how to activate certain X10 infolets to control a home environment.

Further application for utilizing the mobile device server to access home network devices will be readily apparent to one of ordinary skill in the art. For example, motion sensors can be activated and de-activated using a mobile device, such as a cell phone. A user can instruct a recording device to tape a television program using the mobile device server. It is understood that a variety of devices can be used to access a home network. That is, a user can utilize any of a cell phone, PC, PDA, Palm device, etc. to manipulate home network devices. It is further understood that while the mobile device server is primarily described as supporting mobile devices, non-mobile devices such as desktop PCs can communicate with the mobile device server.

Figure 14:
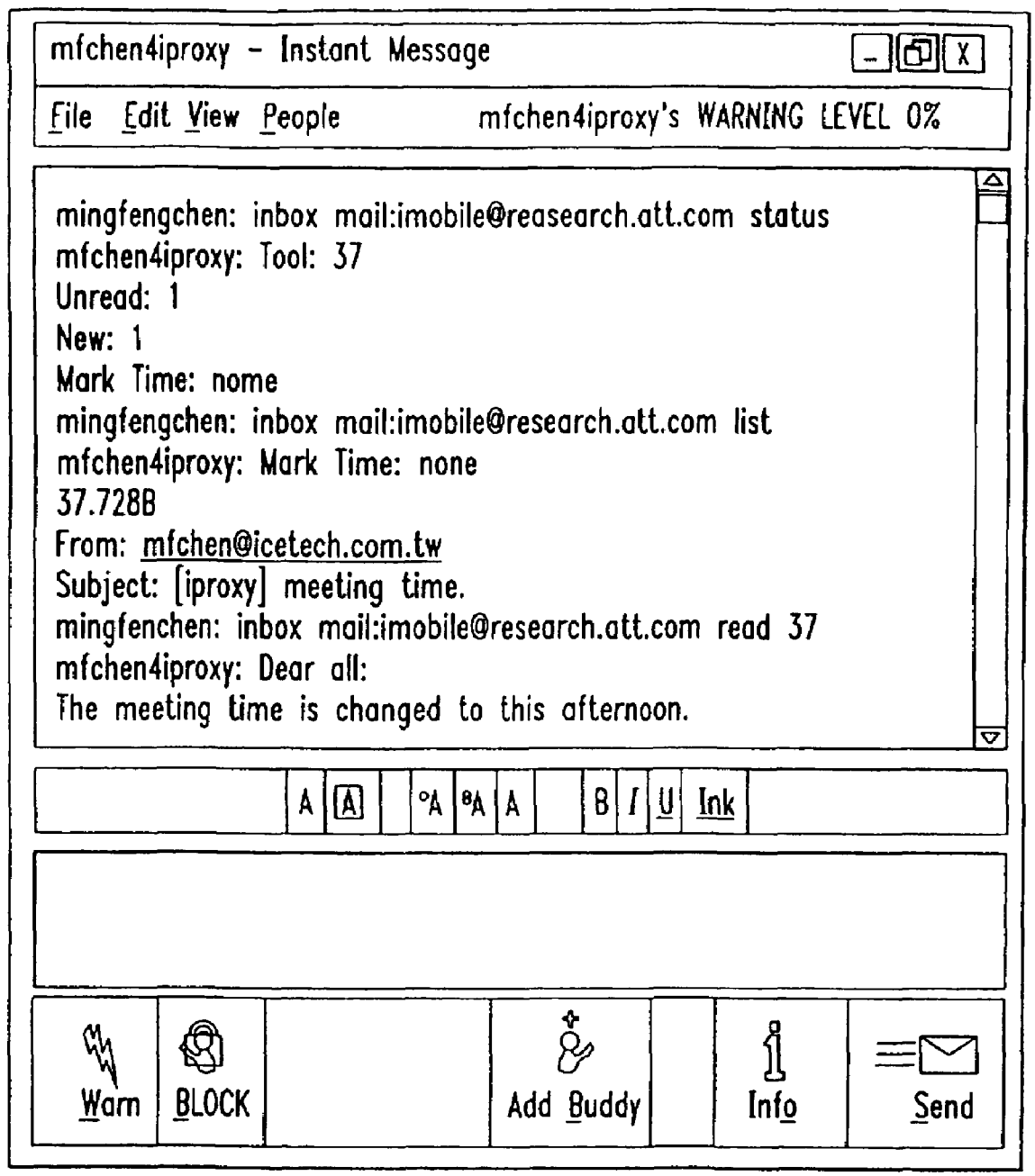
FIG. 14 is an exemplary screen display for a device accessing an inbox of an E-mail account through the AIM devlet on the mobile device server in accordance with the present invention.

FIG. 14 shows a mobile user accessing an email account via a mobile device server in accordance with the present invention. The mobile user first checks the status of the inbox to find the number of unread messages. The mobile device server supports an IMAP infolet called inbox that can query and view a user's email account. The mobile user can look at the size, e.g., 728 bytes, subject, and sender of that message before actually viewing it. Such interaction is advantageous for a mobile user with limited bandwidth and screen space on a mobile device.

As described above, an applet implements business, service, or application logic by processing contents from different sources and relaying results to various destination devices. A simple applet is the "echo" applet described above, which sends a message from one device to another without using any information sources. It is understood that an applet can also have relatively complex interactions with other infolets.

Figure 15:
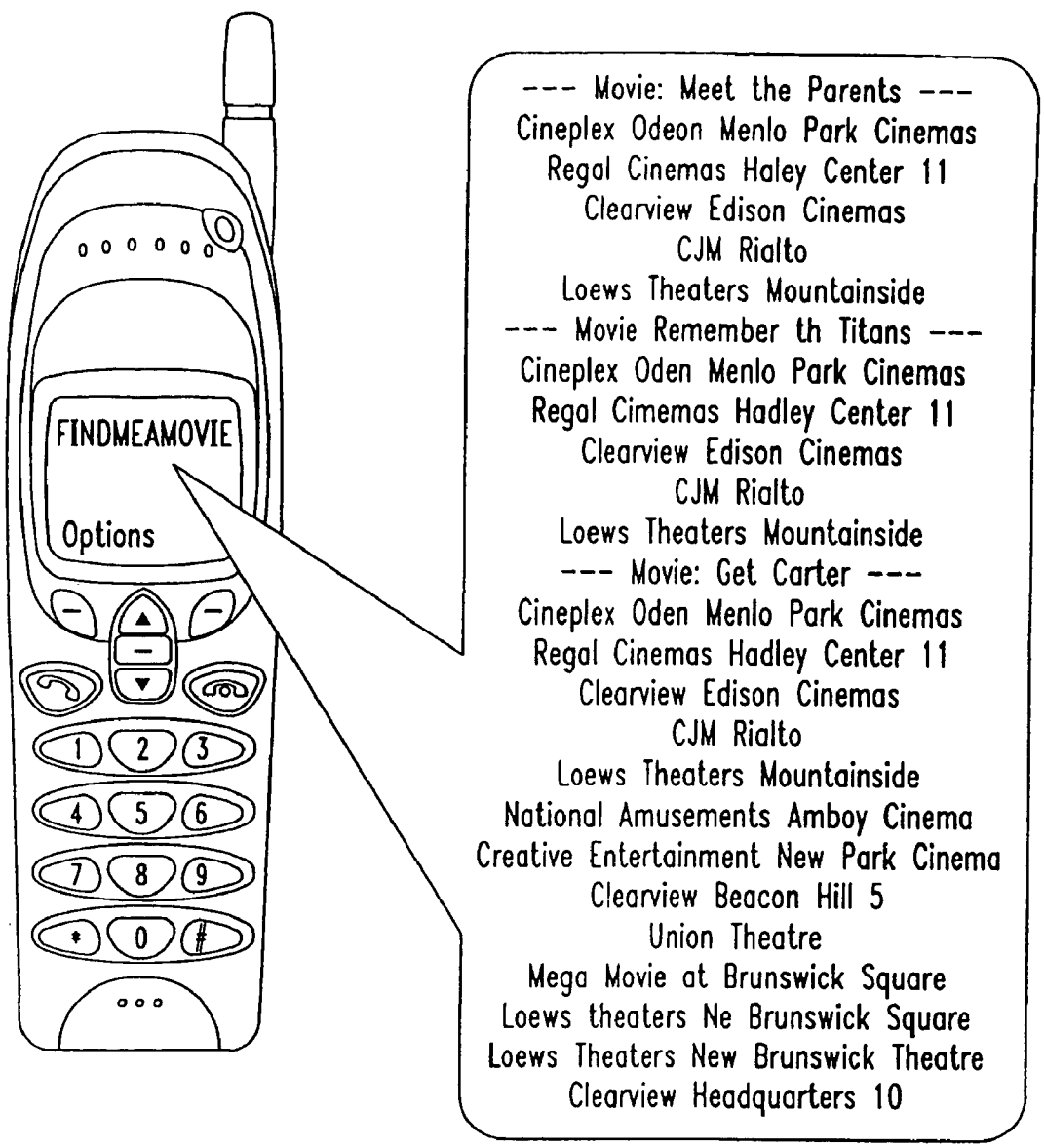
FIG. 15 is a pictorial representation of an applet for finding a movie for a mobile user of a mobile device server in accordance with the present invention.

As shown in FIG. 15, for example, a FindMeAMovie applet can be implemented as an iProxy script as shown below.

```
#!/iproxy/script
# get the localtion information (zip)
:javabin infoLet zip getlocation
# get top10 movies (mlist)
:javabin infoLet mlist top10 movie
:foreach mtitle ${mlist}
    # Find theaters
    -- Movie: ${mtitle} --
    :javabin infoLet thlist findTheater ${mtitle} ${zip}
    :foreach theater ${thlist}
        # List the title & theater
        ${theater}
    :endfor
:endfor
```

This applet finds theaters near a cell phone user that are currently showing the top ten movies by executing the following steps: 1) find out the location (zip code) of the cell phone user, 2) find the top 10 movies from a movie database or website, 3) for each of these movies, find out if any local theater shows that movie, and 4) list the move title and the theater.

In general, each devlet, infolet, and applet must be registered at the let engine first before communications with other agents can occur. Each abstract device that communicates with the mobile device server must register its profile information with the let engine first. A device name is designated by protocol and account ID, i.e., protocol:acct_id. For example, an AIM user webciao is named aim: webciao. The mobile device server maintains a default profile for each device type, and each instance of a device can overwrite that profile with device-specific information. A device profile can simply be a list of attribute-value pairs. An important attribute is dev.format.accept, which determines what MIME type the device is allowed to accept. This information is used by the mobile device server to transcode original content to a format appropriate for this device, as described above. For example, the default profile for an email device is the following and can be named mail.ini in the directory in which device profiles are kept:

dev.format.accept=text/html,*/*
    dev.page.size=−1

The above device profile indicates that the default MIME type is text/html, but all MIME types(*/*) are acceptable. Also, the page size "−1" indicates that there is no limit on the size of each message transmission. These values are inherited by all mail devices unless they are overwritten. For example, while the two default values might be valid for primary email devices (desktop or laptop PC's), they are not appropriate for emails used on cell phones, such as AT&T's PocketNet phone. The following device profile for a PocketNet phone indicates that only the MIME type text/plain is appropriate for this device and that it does not accept messages longer than 230 characters:

dev.format.accept=text/plain dev.page.size=230

A devlet can require additional information that tells the mobile device server how and when to access this device. For example, the following profile for the address imobile@research.att.com, used by the email devlet of the mobile device server, specifies the frequency (every 10 seconds) of checking the email account (store.checktime), the account password (store.url), the transport protocol for sending email (transport.url), last time the user accessed the account (cmd.lasttime), etc.

mail.store.checktime=10000
    mail.store.url=imap://imobile:password@bigmail
    mail.transport.url=smtp://bigmail
    . . .

In general, each device is mapped to a registered user of the mobile device server. Significant reasons for this mapping arrangement include limiting access to legitimate users of the mobile device server; and personalizing a service based on the user profile. An illustrative device-to-user map stored in the server (rarp.ini) is set forth below:

sms:+886935551826=herman
    sms:+19085556842=chen
    mail:dchang@research.att.com=difa
    aim:webciao=chen . . .

It is understood that the mobile device server of the present invention can rely upon a variety of authentication techniques. Since the mobile device server interacts with multiple networks and protocols, the server relies on different authentication mechanisms. In one embodiment, the mobile device server uses the cell phone identification on wireless phone networks, AOL buddy names on the AIM network, and generic user ID and password information for WAP, HTTP, and telnet clients. However, the mobile device server itself does not have control over the security afforded by some of these networks. Alternative embodiments can include the SSH Secure Shell to provide end-to-end authentication services. In general, the technique used by the mobile device server to authenticate a mobile user depends on the device or protocol used. Trusting wireless networks, such as Voicestream/GSM and AT&T TDMA networks, to provide the correct cell phone id when a short message (SMS) is received is generally acceptable unless a cell phone is stolen and the user did not lock the phone with a security password. The mobile device server can also trust the AOL network authentication for non-critical services. User authentication through the mobile device server itself is required if the user accesses the mobile device server through telnet, WAP, or HTTP. Following is a typical and simple user profile:

name=Robin Chen
    password=xf2gbH3
    default=$mail.1
    # my addresses
    sms.1=sms:+19085556842
    mail.1=mail:chen@research.att.com
    mail.2=mail:imobile@mobile.att.net
    mail.all=$mail.1,$mail.2
    aim.1=aim:webciao
    # command aliases
    sms.cmd.q=quote
    sms.cmd.sn=sitenews
    # address aliases
    sms.addr.cc=aim:chrischen This user profile stores the user name, password, and a list of the devices that the user registers with the mobile device server. It also stores command and address aliases. When a user accesses the mobile device server through AIM using the id webciao, the mobile device server determines from the user-device map that the user is chen and uses the user profile chen.ini for all later service requests from this device. For example, the following short message sent from a GSM phone: "forward $mail.1 q T" is interpreted as "forward mail:chen@research.att.com quote T" according to the user profile. The special character "$" requests that the mobile device server map the named device, i.e., mail.1, to its corresponding entry in the profile.

In a further embodiment, the mobile device server supports event driven message generation to one or more users. In general, a user is considered to have previously requested such information when the predetermined event occurs. For example, in the event that a child is absent from school a message is sent to the parents cell phone. The message can be sent to a plurality of devices associated with the parent to ensure that the message is noticed. In addition, messages can be scheduled for delivery at predetermined times. For example, a scheduler applet can periodically check for scheduled events. For example, the mobile device server can send a message to a device at a predetermined time to alert a person that a daily medication should be taken. It is understood that a user can be mapped to multiple devices in the user profile. For example, a user can add to a daily journal located in a one address location via multiple devices, such as a cell phone, PDA, and PC.

Figure 16:
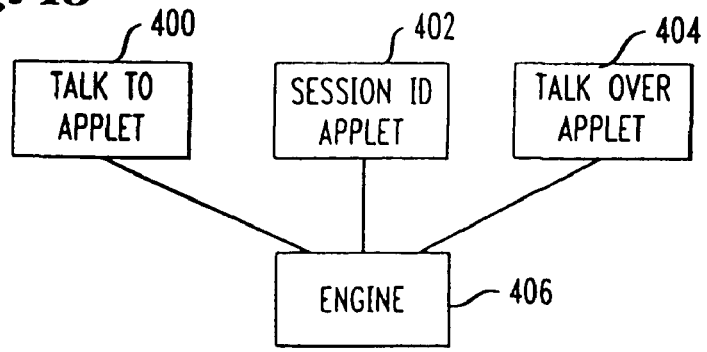
FIG. 16 is a schematic representation of an instant messaging mechanism for a mobile device server in accordance with the present invention.

FIG. 16 shows an exemplary embodiment of mobile device server components for supporting an instant messaging mechanism among a plurality of devices. In one embodiment, the instant messaging mechanism includes a talk to applet 400, a session ID applet 402, and a talkover applet 404. The talk to applet is invoked by the engine component 406 in response to a users request for instant messaging with another device, which can be of the same or different type. The engine component then generates the session ID applet 402 for providing a session ID to each device participating in the instant messaging. The name of the applet corresponds to the session ID, which is shared by the instant messaging users. The talkover applet 404 terminates parties from the instant messaging session. When all of the parties have left the session, the session ID applet 402 ceases to exist.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for adding new components to a mobile device server having a flexible architecture, comprising:
providing an engine component;
providing at least one user/device profile to the engine component,
providing a plurality of interface components communicating with the engine component in a predetermined format, each of the plurality of interface components for providing a respective interface for mobile devices sending data requests;
providing a plurality of access components communicating with the engine component, each of the plurality of access components for providing an abstract view of a respective information source based upon the data requests;
providing a plurality of logic components communicating with the engine component, each of the plurality of logic components for processing information retrieved by the plurality of access components and providing the processed information to one or more of the plurality of interface components for transmission to the mobile devices that sent the data requests; wherein the processed information is adapted using user/device profile from the engine component, and
adding a further one of an interface component, access component and a logic component to support a respective mobile device, information source, and process without altering service logic of the mobile device server.

2. The method according to claim 1, further including formatting the data requests into text.

3. The method according to claim 1, wherein the user/device profile includes a size limitation.

4. The method according to claim 1, further including servicing data requests from devices including at least two device types selected from the group consisting of SMS mobile phones, Palm devices, AIM devices, AOL devices, two way pagers, pocket PCs, and AT&T Pocket Net devices.

5. The method according to claim 1, further including supporting an additional type of mobile device by adding a corresponding interface component without altering service logic.

* * * * *